United States Patent [19]

Arion et al.

[11] Patent Number: 5,315,364
[45] Date of Patent: May 24, 1994

[54] GAUGE FOR MEASURING STRONG SHOCK WAVES

[75] Inventors: Douglas N. Arion, Tijeras; David E. Baird, Albuquerque, both of N. Mex.

[73] Assignee: Science Applications International, Inc., San Diego, Calif.

[21] Appl. No.: 787,296

[22] Filed: Nov. 4, 1991

[51] Int. Cl.$^5$ .................. G01B 11/16; G01B 7/16
[52] U.S. Cl. ................... 356/32; 250/227.11; 385/43; 73/774; 73/784
[58] Field of Search .................. 356/32, 33, 34, 35, 356/43, 44, 73.1; 385/43; 250/227.11, 227.14, 227.18, 227.23; 73/774, 784, 800

[56] References Cited

U.S. PATENT DOCUMENTS

| | | | |
|---|---|---|---|
| 4,451,730 | 5/1984 | Brogardh et al. | 350/32 |
| 4,492,121 | 1/1985 | Lehto | 250/227.11 |
| 4,521,070 | 6/1985 | Sottini et al. | 385/43 |
| 4,533,243 | 8/1985 | Zhukov et al. | 356/44 |
| 4,798,438 | 1/1989 | Moore et al. | 385/43 |
| 4,805,461 | 2/1989 | Coupta et al. | 250/227.18 |
| 4,933,545 | 6/1990 | Saaski et al. | 250/227.14 |
| 4,946,250 | 8/1990 | Gonthier et al. | 385/43 |
| 5,071,212 | 12/1991 | Mesaki et al. | 385/43 |
| 5,090,818 | 2/1992 | Kleinerman | 356/44 |

OTHER PUBLICATIONS

Pound, M., et al., "Yield Determination . . . Strong Shock Algorithm", SAIC/90-7052 (Mar. 1990), 32 pages.
Tan, H., et al., "Shock Induced Polymorphic . . . boron nitride", J. Appl. Phys. 67(1) (Jan. 1990), pp. 217-224.
Boslough, M., et al., "A Sensitive time-resolved . . . 1500K", Rev. Sci. Instr. 60(12) (1989), pp. 3711-3716.
. . . "S. Cubed Experiments", Misty Echo Program Document, POR 7268 (May 1988), pp. 88-93.
Veeser, L., et al., "Sensing of high pressure . . . optical fibers", SPIE vol. 838 (1987), pp. 60-68.
Kondo, K., et al., "Shock-induced radiation . . . fused quartz", J. Appl. Phys. 54(8) (1983) pp. 4382-4385.

Primary Examiner—Richard A. Rosenberger
Assistant Examiner—Hoa Q. Pham
Attorney, Agent, or Firm—Fitch, Even, Tabin & Flannery

[57] ABSTRACT

A shock wave gauge (20) is made from a piece of pure-quartz glass rod (22), or other suitable transparent mineral material. A segment (38) of the rod is uniformly heated above its melting point. The heated segment is then drawn away from a non-heated body segment, forming an optical fiber thread (26). The thread is thinned to a desired size while the rod material is still above its melting point. Upon cooling, the fiber optic thread is cut to a desired length. The body segment (24) of the rod and fiber optic thread (26) drawn therefrom comprise the gauge. The gauge is preferably assembled inside of a housing (34) to protect the thread, with at least one end (24') of the body segment protruding out from the housing. In use, a shock wave impacts the exposed end of the body segment. The pressure of the shock wave causes the temperature of the rod material to rise by an amount proportional to the pressure. The impact of the shock wave also causes a light pulse to be emitted by the rod having a wavelength that is a function of the temperature. The light pulse travels out the formed fiber optic thread and is optically coupled to remote processing apparatus (92), which apparatus analyzes the wavelength of the emitted pulse, and hence provides a measure of the pressure of the shock wave.

1 Claim, 6 Drawing Sheets

GAUGE FOR MEASURING STRONG SHOCK WAVES

BACKGROUND OF THE INVENTION

The present invention relates to the measurement of strong shock waves, such as shock waves generated during an earthquake, volcanic activity, explosives testing, strong impacts or collisions, and nuclear testing. More particularly, the invention relates to an optical gauge or sensor that may be used to reliably measure shock amplitude for yield verification determination, or other purposes, in environments or conditions where conventional shock gauges or pressure sensors are ineffectual.

For purposes of this application, a "shock wave" is a compression wave produced by a sudden change in pressure and particle velocity. If the sudden change in pressure and particle velocity (hereafter "disturbance") is small, the result is an ordinary sound wave. If the disturbance is severe, however, such as occurs with a massive body rushing rapidly through the air or with an explosion, the result is a definite discontinuity called a strong shock wave. The passage of a strong shock wave through a solid or fluid can redistribute atoms, change the levels of electron energy, and alter the internal energy balance.

There is a frequent need in the art to measure strong shock waves. For example, during nuclear underground testing, it is desirable to verify the yield of the explosion, i.e., how much energy was released, in order to verify compliance with applicable international treaties that limit the use and testing of nuclear devices. See, e.g., "Seismic Verification of Nuclear Testing Treaties'" Office of Technology Assessment (Gregory E. Van Der Link, Project Director) (Library of Congress 88-600523, 1988), hereafter "Seismic Verification".

Yield verification measurements are typically made by measuring the time of arrival (TOA) and physical force associated with the shock wave created by the nuclear explosion. Such measurements are made at various points and distances surrounding the point of origin of the explosion. Unfortunately, conventional sensors, such as piezoelectric crystals, are limited in such measurements because the electrical wires used to couple the sensors to appropriate instrumentation apparatus are destroyed or rendered ineffective (e.g., through electrical pickup of noise associated with the blast). What is needed, therefore, is a sensor or gauge that can withstand strong shock waves and reliably signal appropriate instrumentation apparatus of the sensed force.

The measurement of the source yield on underground tests for the purpose of yield verification has been based, in large part, on the use of TOA measurements using a technique known as "Continuous Reflectometry for Radius verses Time Experiments" (CORRTEX), described generally in the aforecited Seismic Verification reference. In recent years, the CORRTEX technique has been augmented by a particle velocity measurement technique, referred to as KRATZ. The KRATZ gauge is a particle velocity gauge that operates on the principle of embedding a static magnetic field generator in the shock medium and measuring its relative displacement during the shock. A magnesium plate with a current coil embedded in it having an overall density of the shock medium is embedded in the shock media. A magnetic field is established around the current coil prior to shock arrival. Nearby are placed pickup coils that are stationary relative to the magnesium plate displaced during shock arrival. These coils detect a change in magnetic field intensity as the plate moves and thereby can determine the motion of the plate. Since the plate is well matched to the shock medium, the plate can be assumed to be at the particle velocity at that point. These measurement techniques generally assume that valid data, e.g. noise-free data, has first been obtained. Unfortunately, valid data cannot always be obtained due to the problems mentioned herein.

For example, when making international yield verification measurements, there is a requirement that an anti-intrusion switch be coupled to the seismic sensor or gauge to transiently disconnect the gauge prior to zero time. (Note: "zero time" is the precise moment of the detonation that creates the disturbance that causes the shock wave.) Unfortunately, most sensors known in the art for sensing a strong shock wave, e.g., flat pack stress gauges, are "active" gauges, meaning that they require operating power before, during and after sensing the shock wave. In addition to the electrical noise pickup problems that accrue whenever operating power is coupled to the active gauge over conventional wires, the use of active gauges is not particularly amendable to the use of anti-intrusion switches. Hence, what is needed is a purely passive shock gauge that does not require any operating power before, during, or after a shock measurement, and which is thus more amenable to the use of anti-intrusion switches.

Additionally, prior art shock gauges, e.g., flat pack stress gauges, only provide an output electrical signal indicative of the magnitude of the sensed force, and the time at which the force was sensed. Unfortunately, the transmission of this signal to a remote location where the signal can be processed results in a loss of signal strength due to the normal losses associated with an electrical transmission line or cable. associated with the impact of the shock wave, in addition to pressure and TOA data. Such other data may include, for example, thermodynamic data associated with the medium as the shock wave passes therethrough. Heretofore, other sensors adapted to sense the other parameters of interest, e.g., temperature, have had to be employed if such data was to be collected. The use of such other sensors in an environment subjected to strong shock waves is subject to the same problems as is the use of active shock gauges, as described above. Therefore, it would be desirable if a single passive gauge could be employed that provided all or most of the data of interest, e.g., pressure, TOA, and thermodynamic/hydrodynamic data, and if such data could be transmitted to a location removed from the gauge location without appreciable lose in signal strength, and without being susceptable to electrical noise.

One further problem associated with the use of any gauge is the problem of "gauge inclusion". Gauge inclusion relates to the problem of having the gauge itself influence the measurement. For example, if a normal-sized, mercury bulb, thermometer is inserted into a thimble full of water, the temperature of the thermometer prior to the insertion will likely raise or lower the temperature of the water, depending upon the initial temperature of the thermometer, thereby providing a "false" temperature reading of what the water temperature was prior to the insertion. Similarly, if a shock gauge is placed in a medium through which a shock wave is to be measured, the shape, size and material of the shock gauge can influence the manner in which the shock wave propagates, just like a boulder in a creek diverts the flow of water in the creek. A flat pack stress gauge, for example, typically includes a flat plate designed to be positioned perpendicular to the direction of propagation of the shock wave, thereby creating a potentially significant gauge-inclusion interference. Further, such a flat pack stress gauge is made from a material different than that of the material through which the shock wave to be measured is propagating. Hence, the problem of gauge inclusion with a flat pack stress gauge is heightened. What is needed, therefore, is a shock wave gauge that is made from the same or similar material as the medium through which the shock wave is propagating, and that can assume a shape so as to minimize interfering with or altering the shock wave propagation, thereby minimizing the problems associated with gauge inclusion.

SUMMARY OF THE INVENTION

The present invention provides a passive optical shock wave gauge that addresses the above and other needs. A shock wave gauge made in accordance with the invention may hereafter be referred to as a Blast Induced Emission of Radiation (BIER) gauge.

More particularly, in accordance with one aspect of present invention, a BIER shock wave gauge is made from a piece of pure-quartz glass rod, or other suitable transparent mineral material, having a fiber optic thread drawn from at least one end thereof. In use, the gauge is positioned so that a shock wave to be measured impacts a body segment of the rod. The pressure of the shock wave causes the temperature of the rod material to rise by an amount proportional to the pressure (force) associated with the shock wave. The relationship between pressure and temperature is known as the material Hugoniot, and the Hugoniots of many materials, including quartz, are known and documented. The elevated temperature caused by the impact of the shock wave causes light to be emitted from the material having a peak wavelength that is a function of the temperature. The light propagates through the formed fiber optic thread and is optically coupled to remote processing apparatus. The remote processing apparatus analyzes the received light to determine its wavelength, and hence provides a measure of the temperature of the gauge material, from which the pressure of the shock wave can be determined.

Typically, a shock wave is measured by using more than one such BIER gauge, each having the body segment of the rod at a different location so as to receive the impact of the shock wave front at a different time. Alternatively, a shock wave gauge assembly having a plurality of rods with their respective body segments, e.g., tips, at differing locations relative to the incoming shock wave front may be used. Analysis of the emitted light in such an assembly provides information relative to the pressure of the shock wave as well as information relative to the times of arrival (TOA) of the shock wave at the respective tips thereby enabling shock velocity data to be determined.

Numerous advantages accrue through the use of a BIER shock wave gauge made in accordance with the present invention. For example, the measurement is entirely passive, and thus does not, for example, require a bias voltage such as is needed with flat pack stress gauges of the prior art. Further, the measurement is entirely optical, and not subject to electrical pickup in the neighborhood of the event. Moreover, the fiber optic transmission is nearly lossless over the distances associated with vertical line-of-sight (VLOS) and horizontal line-of- sight (HLOS) events. Still further, the measurement provides thermodynamic/hydrodynamic data in addition to time of arrival (TOA) and shock velocity.

In addition, because the BIER gauge of the present invention is formed from quartz or other similar transparent mineral material, it more closely matches the surrounding medium wherein the gauge is typically placed, e.g., in earth or rock underground. Thus, the gauge has a less severe problem with gauge inclusion than do other diagnostic techniques, such as flat pack stress gauges.

In making the BIER gauge of the present invention, a segment of a rod of mineral material, e.g., a pure-quartz glass rod, is uniformly heated above its melting point. The heated segment is then drawn away from a non-heated body segment, forming an optical fiber thread. The thread is thinned to a desired size while the rod material is still above its melting point. Upon cooling, the fiber optic thread is cut to a desired length. The body segment of the rod and fiber optic thread drawn therefrom comprise the gauge. The gauge is preferably assembled inside of a housing to protect the thread, with at least one end of the body segment protruding out from the housing. A fiber optic connecter is preferably connected to the end of the formed fiber optic thread to allow a conventional fiber optic cable to be connected thereto.

In accordance with another aspect of the invention, a fiber optic thread may be drawn out from both sides of the body segment, thereby allowing a plurality of such gauges to be connected in series.

One embodiment of the invention may thus be characterized as a shock wave gauge. Such gauge includes: (1) a length of mineral material, such as a pure-quartz glass rod; and (2) an optical fiber made from the mineral material that is drawn out from the length of mineral material. The mineral material has a material Hugoniot whereby the temperature of the mineral material increases as the pressure associated with a shock wave impacting the material increases. Further, a light pulse having a wavelength that varies as a function of the material's temperature is emitted from the material upon having its temperature elevated, i.e., upon impact of the shock wave. The light pulse is detectable through the output optical fiber. Hence, the wavelength of the light pulse emitted by the mineral material varies as a function of its temperature, which in turn varies as a function of the pressure of the shock wave that impacts it.

The invention also includes a method of making a shock wave gauge from transparent mineral material. The transparent mineral material has a known material Hugoniot as described above, i.e., the temperature of the transparent mineral material increases as the pressure associated with a shock wave impacting the transparent mineral material increases, with a light pulse being emitted from the transparent mineral material upon such temperature elevation, and hence upon impact of a shock wave on the material. The light pulse thus emitted has a wavelength that varies as a function of the mineral material's temperature. The method of making such a shock wave gauge includes the steps of: (1) uniformly heating an end segment of a rod of the transparent mineral material above its melting point; (2) drawing a body segment of the rod, which has not been uniformly heated, away from the heated end segment, thereby forming a fiber; (3) thinning the formed fiber to a desired size; and (4) cooling the formed fiber, and cutting it to a desired length. As described previously, the body segment and formed fiber comprise the shock wave gauge, with the light pulse being emitted through the formed fiber. A fiber optic connector may be attached to the end of the formed fiber, so that a conventional optic fiber cable may be attached thereto in order to direct the emitted light pulse to appropriate instrumentation apparatus positioned away from the shock way gauge. Further, a protective housing may be placed around all but a portion, e.g., one end, of the body segment, thereby protecting the formed fiber.

Still further, the invention may be characterized as a system for measuring shock waves. Such system includes: (1) a shock wave gauge that emits a pulse of light having a wavelength proportional to the pressure of a shock wave that impacts the shock wave gauge, with the shock wave gauge including: (a) a section of transparent mineral material, and (b) an optical fiber drawn out from the section of transparent mineral material, the emitted pulse of light being transmitted through the optical fiber; and (2) processing means optically coupled to the first optical fiber for collecting and analyzing the emitted light pulse to determine its magnitude and spectral content. Advantageously, the wavelength of the emitted light pulse provides an indication of the temperature of the shock wave gauge, from which indication a determination can be made of the pressure associated with the shock wave impacting upon the shock wave gauge.

It is thus a feature of the invention to provide a simple and reliable system and method for measuring strong shock waves, such as are encountered in underground nuclear tests, earthquakes, volcanoes, explosives testing, and other strong impacts.

It is another feature of the invention to provide a shock wave gauge that is entirely passive, and that does not require bias voltages or other external signal before, during or after a measurement is made.

It is a further feature of the invention to provide such a passive shock wave gauge that is amenable to the use of anti-intrusion switches that transiently disconnect the gauge prior to zero time. It is noted that anti-intrusion switches are commonly used when making international yield measurements to verify compliance with various international treaties.

It is still another feature of the invention to provide a shock wave gauge that is entirely optical, and therefore not particularly susceptible to electrical noise pickup in the neighborhood of the event. This is a particularly advantageous feature in view of the large electromagnetic pulse (EMP) noise that is associated with most explosions or eruptions of the type that create the strong shock waves measured with the gauge of the present invention. Optical data transmission is also advantageous because the data may be transmitted over fiber optic transmission lines, which transmission is nearly lossless over the distances associated with most events.

It is yet a further feature of the invention to provide a shock wave gauge and method of making a shock wave measurement that provides thermodynamic/hydrodynamic data in addition to time of arrival and shock velocity data.

It is another feature of the invention to provide a shock wave gauge that is formed from a mineral material that more closely matches the surrounding medium in which the gauge is inserted, thereby minimizing the problem of "gauge inclusion" in the resulting measurement.

It is an additional feature of the invention to provide a method of making a shock wave gauge having the above-described features from commonly available materials, such as pure-quartz glass rod.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
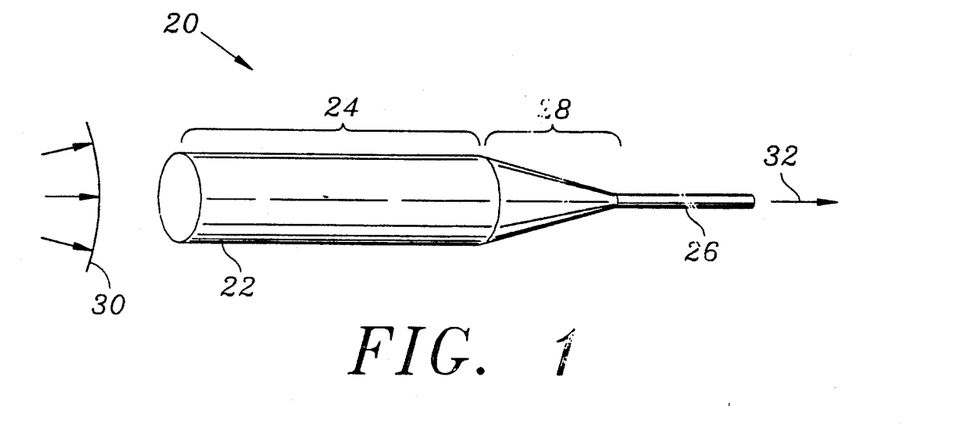
FIG. 1 is a diagrammatic view of a shock wave gauge made in accordance with the present invention.

Referring first to FIG. 1, there is shown a diagrammatic view of a shock wave gauge 20 made in accordance with the present invention. The gauge 20 is made from a transparent mineral material, preferably formed in the shape of a rod, such as a pure-quartz glass rod 22. The gauge 20 includes two main elements: (1) a body segment 24; and (2) a fiber optic thread 26 that is drawn from one end of the body segment 24. There is also a transitional segment 28 wherein the diameter of the rod 22 tapers down to the diameter of the fiber optic thread 26. The relative length of the body segment 24 to the transitional segment 28 is not critical. All that is important is that the fiber optic thread 26 be of the same material as the body segment 24 and be drawn therefrom so that any optical pulses emitted from within the body segment, or being transmitted through the body segment, be detectable through the fiber optic thread 26.

In operation, the gauge 20 is positioned so that a shock wave to be measured, shown symbolically in FIG. 1 as a wave front 30, impacts the body segment 24 of the gauge. The pressure of the shock wave 30 causes the temperature of the gauge material, e.g., pure-quartz glass, to rise by an amount proportional to the pressure (force) associated with the shock wave. The relationship between pressure and temperature of a given material is known as the material Hugoniot, and the Hugoniots of many materials have been studied and documented, including quartz (see Table 1, below). When the shock strength is below approximately 150 to 200 Kbars, the rod material maintains its basic crystal characteristic. When the shock strength is above about 200 Kbars, the rod changes its form and becomes stichovite. Hence, the applications for the gauge 20 are for regimes where the pressure of the shock wave is below approximately 200 Kbars when formed of quartz.

Advantageously, when any material is heated, it emits light. At lower temperatures, the emitted light is in the infrared range. At higher temperatures, the emitted light is visible. The gauge 20 advantageously uses this principle to determine the amount of temperature rise within the pure-quartz glass rod 22. The amount of temperature rise, in turn, provides a measure of the pressure that has impacted the body portion 24 of the gauge 20. That is, the impact of the shock wave causes the temperature of the rod material to rise, and also causes a light pulse to be emitted. This light pulse is characteristic of the temperature of the rod 22. Hence, by measuring the spectrum of the emitted light pulse, represented symbolically in FIG. 1 as the arrow 32, the temperature is uniquely determined. Once the temperature is uniquely determined, the pressure can also be determined from the known Hugoniot of the material.

It is noted that throughout this application, the emitted light from the gauge 20 is referred to as a "pulse". This is because such emitted light will typically be of short duration, commensurate with the duration of the shock wave that is sensed. Any variations in the pressure sensed by the gauge would be reflected by corresponding changes in temperature, which in turn would be manifest by changes in the spectrum of the emitted light.

Thus, in operation, the emitted light (whether infrared or visible) from the gauge 20 is monitored by remote instrumentation apparatus through the formed fiber thread 26, and any other fiber optic cables that may be connected to the fiber thread 26, and collected and analyzed to determine its spectrum. Advantageously, by determining the light characteristics, and in particular by determining a time-resolved spectrum of the received light, the characteristics of the shock wave can be ascertained. The data thus obtained can then be used, using conventional analytical measurement and processing techniques, such as CORRTEX and/or KRATZ, to characterize the source of the shock, and the amount of energy released.

The Hugoniot (pressure-temperature relationship) for pure-quartz glass is shown in Table 1, which table also includes an indication of the wavelength of the emitted light from the material at that temperature.

TABLE 1

| Pure-Quartz Hugoniot and Emitted Light Spectrum | | |
|---|---|---|
| Pressure (Kbars) | Approximate Temperature (°C.) | Peak Wavelength (nm/microns) |
| 20 | 330 | 8520/8.52 |
| 40 | 440 | 7200/7.20 |
| 60 | 580 | 6020/6.02 |
| 80 | 780 | 4880/4.88 |
| 100 | 980 | 4100/4.10 |

It should be emphasized that while the preferred material for the gauge 20 is pure-quartz, other materials having known or characterizable Hugoniots may also be used, such as various plastics, sapphire (aluminum oxide), and the like. Further, it is to be emphasized that the shape of the gauge, while preferably as described above (a segment of a rod having a fiber drawn from at least one end thereof), may assume other shapes as well. Any material that provides the desired optical output pulse upon being impacted with a shock wave, and any shape that facilitates the transmission of this light pulse through the optic fiber towards remote instrumentation apparatus may be used in a gauge made in accordance with the present invention.

Figure 2:
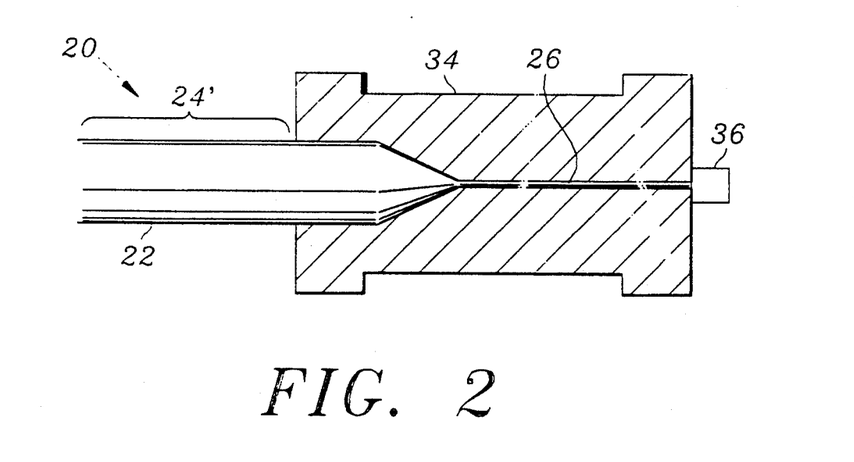
FIG. 2 shows the gauge of FIG. 1 inserted into a protective housing.

FIG. 2 shows the gauge 20 of FIG. 1 as inserted into a protective housing 34. The primary purpose of the housing 34 is to protect the delicate fiber thread 26 that is drawn from one end of the rod 22. A fiber optic connector 36, which is of conventional design, is attached to the end of the fiber thread 26 at the point where it exits from the housing 34. A conventional fiber optic cable or transmission line, not shown in FIG. 2, may then be detachably secured to the connector 36 in order to couple the emitted light to desired instrumentation apparatus that is positioned a desired distance from the gauge 20.

In general, any type of housing shape and construction that provides the desired protection for the delicate fiber thread 26 may be used. A bobbin-shaped housing is shown in the figures for the protective housing 34 only because such housing shape is easy to manufacture and handle. A portion 24' of the rod 22 extends out from housing 34 a prescribed distance. The extended portion 24' of the rod 22 comprises the effective body segment of the gauge 20 that is exposed to the incoming shock wave. Typically, the gauge 20 will be oriented as shown in FIG. 1 relative to the incoming shock wave, so that the shock wave first impacts the tip of the body segment 24'. Such orientation minimizes problems associated with gauge inclusion. However, the basic operating principles of the invention apply regardless of the point of impact of the shock wave on the body segment 24'.

Advantageously, the gauge 20 is a passive gauge that requires no operating power. Hence, all the problems associated with generating and supplying power to the gauge before, during and after a measurement are obviated. This feature facilitates use of the gauge 20 with anti-intrusion switches, should such switches be required for the particular measurement being made. Further, the only output signal from the gauge is the emitted light pulse 32, which can be sensed with minimal loss, through the fiber optic thread 26, and any other fiber optic cables connected thereto. Advantageously, such optical transmission may occur without being noticeably affected by electrical noise pickup problems. Hence, the use of the gauge 20 in noisy EMP environments is facilitated.

It is thus seen that the present invention is entirely passive, and does not require bias voltages or other external signal(s) before, during or after a measurement is made. It is also seen that the passive shock wave gauge thus provided is amenable to being used with anti-intrusion switches. Moreover, it is seen that the invention provides a shock wave gauge that is entirely optical, and therefore not particularly susceptible to electrical noise pickup in the neighborhood of the event. Further, it is seen that the optical data transmission advantageously allows the data to be transmitted over fiber optic transmission lines, which transmission lines are nearly lossless over the distances associated with most applicable events (e.g., up to 1000 feet.)

Referring next to FIGS. 3A-3F, the sequence of steps used in making the gauge 20 of the present invention are illustrated, respective lines of the figure, labeled "A". These steps can be performed using conventional techniques and skills known to those who work with glass and similar crystalline materials.

Figure 3A:
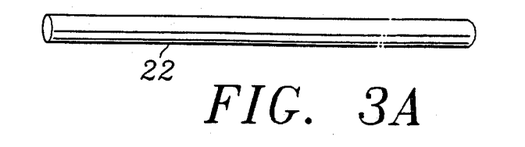
FIGS. 3A, 3B, 3C, 3D, 3E, and 3F show the basic steps of making and assembling the shock wave gauge of the present invention.
Figure 3B:
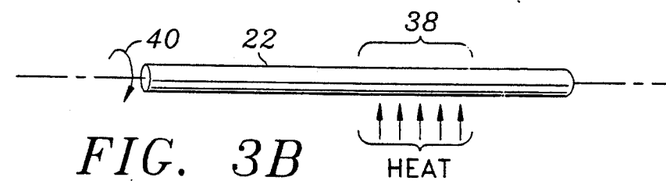

As a first step shown in FIG. 3A, a suitable length of rod 22 is secured. The rod can be any size, but typically is obtained from commercially available stock having a diameter of from 0.125 inches to 0.75 inches. A segment 38 of the rod 22 is then heated, as shown in FIG. 3B. Preferably, while heat is applied to the segment 38, the rod 22 is rotated, as shown by the arrow 40, thereby uniformly applying the heat to the segment 38.

Figure 3C:
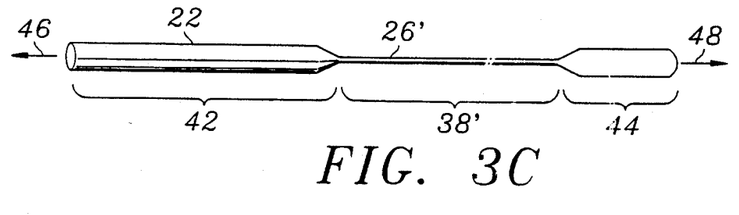

After the segment 38 has been uniformly heated above its melting point, and while maintaining the temperature of the segment 38 at an above-melting-point level, the end segments 42 and 44 of the rod (which are not heated above the melting point) are pulled apart, as represented by the arrows 46 and 48 in of FIG. 3C. This action stretches the segment 38, forming a stretched segment 38' that comprises a fiber thread 26' connecting the end segments 42 and 44. Advantageously, diameter and length of the fiber thread 26' can be formed to any suitable value by simply adjusting the length of the segment 38 to which the heat is applied, and the distance to which the end segments 42 and 44 are pulled apart. Typically, the fiber thread 26' will be formed to a small diameter, on the order of 50 to 200 micrometers (microns).

Figure 3D:
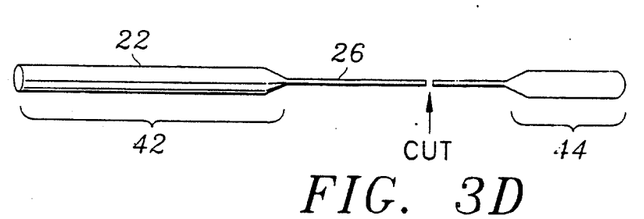

Once the fiber thread 26' has been formed to a desired length and diameter, it is allowed to cool below the melting point. Then, the thread is cut to a desired length, as shown in FIG. 3D. Once cut, the two end segments 42 and 44, and the resulting fiber threads drawn therefrom, comprise a pair of gauges 20 as described above in connection with FIG. 1, with one being somewhat shorter in length than the other (for the particular arrangement shown in FIG. 3D).

Figure 3E:
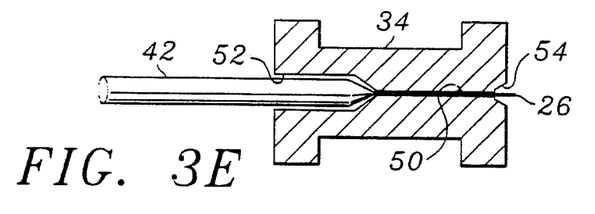
Figure 3F:
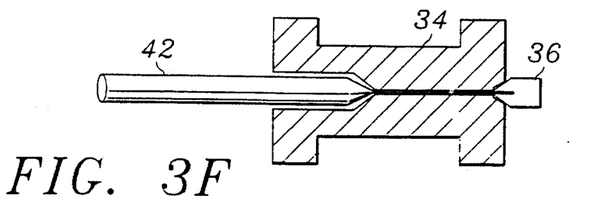

Next, as shown in of FIG. 3E with respect to one of the two gauges formed on line "D", the fiber thread 26 and a portion of the end segment 42 are inserted into a housing 34. The housing 34 has a hole 50 drilled therethrough having a diameter just slightly larger than the diameter of the fiber thread 26. This hole is counterbored with a much larger hole 52 at one end of the housing 34. The counterbored hole 52 has a diameter just slightly larger than the diameter of the rod 22. At the other end of the housing 34, a smaller hole 54 is counterbored having a diameter sized to fit an optical connector 36. The gauge 20 is inserted into the housing 34 so that the fiber thread 26 extends through the hole 50, and one end of the end segment 42 slips into the counterbored hole 52. If desired, a suitable filler and adhesive material, such as epoxy, may be spread on the fiber thread 26 and one end of the end segment 42, as well as on the inside of the holes 50 and 52, while still in its liquid state, thereby providing a measure of lubrication as the assembly takes place. When the epoxy cures, the gauge 20 is thus firmly held in position within the housing 34.

The quartz rod 22 typically has a diameter of from $\frac{1}{8}$ to $\frac{3}{4}$ inches, although any sized rod could be used. Typically, the rod will extend from the housing 34 a distance of between 2-12 inches.

Figure 4:
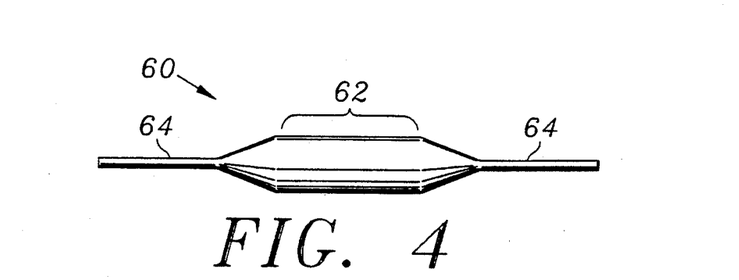
FIG. 4 shows an in-line shock wave gauge made in accordance with the invention.

FIG. 4 shows an alternative embodiment of the invention that comprises an in-line shock wave gauge 60. The in-line gauge 60 includes a body portion 62 and a fiber thread 64 drawn from each end of the body portion. The in-line embodiment 60 is made in the same manner as described above in connection with FIG. 3 except that the rod 22 is heated on both sides of the body portion, preferably sequentially, and the fiber thread 64 is drawn out from the heated side of the body portion.

Figure 5:
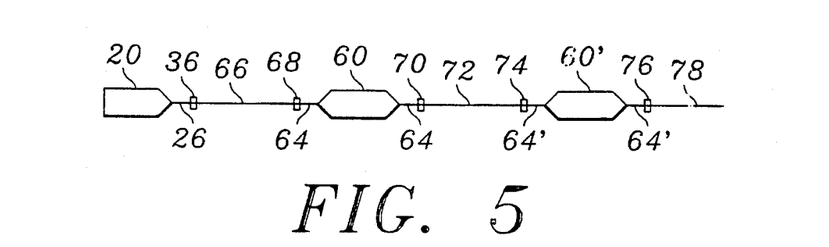
FIG. 5 shows how a plurality of in-line gauges as shown in FIG. 4 may be connected in series.

FIG. 5 shows how a plurality of in-line gauges 60 may be connected in series. Typically, a chain of such gauges starts with a gauge 20, as described above, that has a single fiber thread 26 extending from one side thereof. This fiber thread 26 is connected, via connector 36, to a suitable fiber optic cable 66. The fiber optic cable 66, in turn, is connected via another connector 68, to one of the fiber threads 64 of a first in-line gauge 60. The other fiber optic thread 64 from the first in-line gauge 60 is connected via another connector to a second optic fiber cable 72. The optic fiber cable 72 is connected via still another connector 74 to one of the two fiber threads 64' of a second inline gauge 60'. The other fiber thread 64' of the inline gauge 60' connects to yet a further fiber optic cable 78. The fiber optic cable 78, in turn, may connect to yet a third in-line gauge, or to suitable instrumentation apparatus. Advantageously, with the inline arrangement shown in FIG. 5, a shock wave may be sensed by any of the gauges 20, 60 or 60', and the resulting light pulse is detectable at the remote instrumentation apparatus because the light pulse is able to pass through the in-line gauges.

Generally, the various gauges are positioned relative to the anticipated shock wave such the time of arrival of the light pulses at the instrumentation apparatus provides an indication of the source of the light pulse. In this regard, it is noted that the light pulses travel through the various gauges and fiber optic cables at a speed that is equal to or nearly equal to the speed of light, approximately $3 \times 10^8$ m/sec. In contrast, the shock wave front travels at a relatively slow speed, e.g., one or two times the speed of sound (approx. 5000 m/s), and sometimes (depending upon the medium) much less than the speed of sound. Hence, by strategically positioning the various in-line or other gauges so that the anticipated shock wave will not impact any two gauges at the same time, it is possible to determine from which gauge a given light pulse originates simply from the sequence of the time of arrival of the pulse, with the gauge closest to the shock wave source emitting its light pulse first. It is also possible to determine the speed of the shock wave front by simply measuring the time between adjacent light pulses emitted from adjacent gauges having a known spacing (distance) therebetween.

Figure 6:
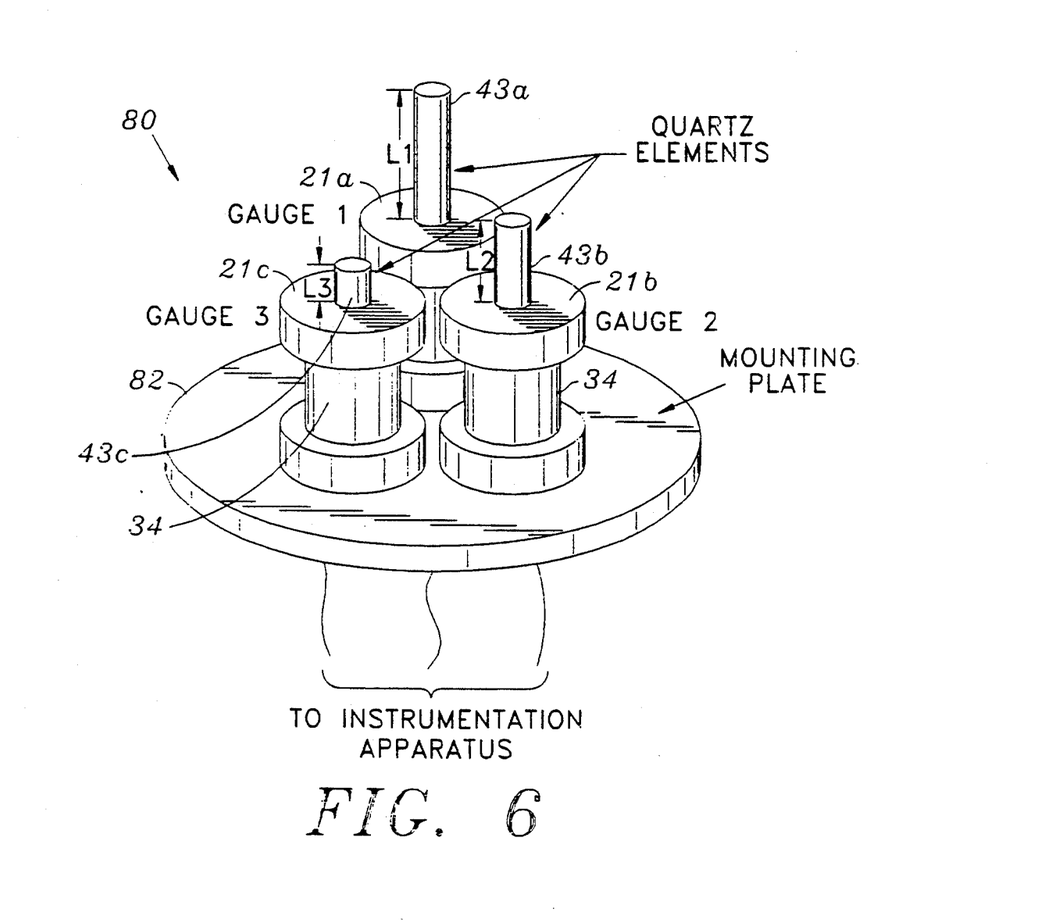
FIG. 6 shows a shock wave gauge assembly made in accordance with one embodiment of the present invention wherein three individual sensors are mounted on the same mounting plate.

FIG. 6 shows a triplet shock wave gauge assembly 80 made in accordance with another embodiment of the present invention. Such embodiment uses three individual gauges 21a, 21b and 21c, of the type described above in connection with FIGS. 1-3. These gauges are mounted on a single mounting plate 82. A fiber optic cable, or equivalent, is connected to each gauge so that the light pulses emitted therefrom can be optically coupled to suitable instrumentation apparatus.

The first gauge 21a of the triplet assembly 80 has a quartz rod element 43a (body segment) that extends a distance L1 from its respective housing 34. The second gauge 21b has a quartz rod element 43b that extends a distance L2 from its respective housing 34. Similarly, the gauge 21c has a quartz rod element 43c that extends a distance L3 from its respective housing 34. As seen in FIG. 6, $L1>L2>L3$. Hence, assuming that the triplet gauge assembly 80 is oriented so that the tips of the quartz rod elements are impacted by the shock wave front, the gauge 21a emits a light pulse first, the gauge 21b emits a light pulse second, and the gauge 21c emits a light pulse third. The time between the emission of the first and second light pulses comprises the time it takes the shock wave to traverse the distance L1-L2. Similarly, the time between the emission of the second and third light pulses comprises the time it takes the shock wave to traverse the distance L2-L3; and the time between the emission of the first and third light pulses comprises the time it takes the shock wave to traverse the distance L1-L3. Thus, the triplet assembly 80 advantageously provides three independent measurements of the shock wave velocity. Moreover, each individual light pulse provides a measure, when the spectrum of the light pulse emitted from each gauge is analyzed, of the thermodynamic/hydrodynamic data at each sensing point.

Figure 7:
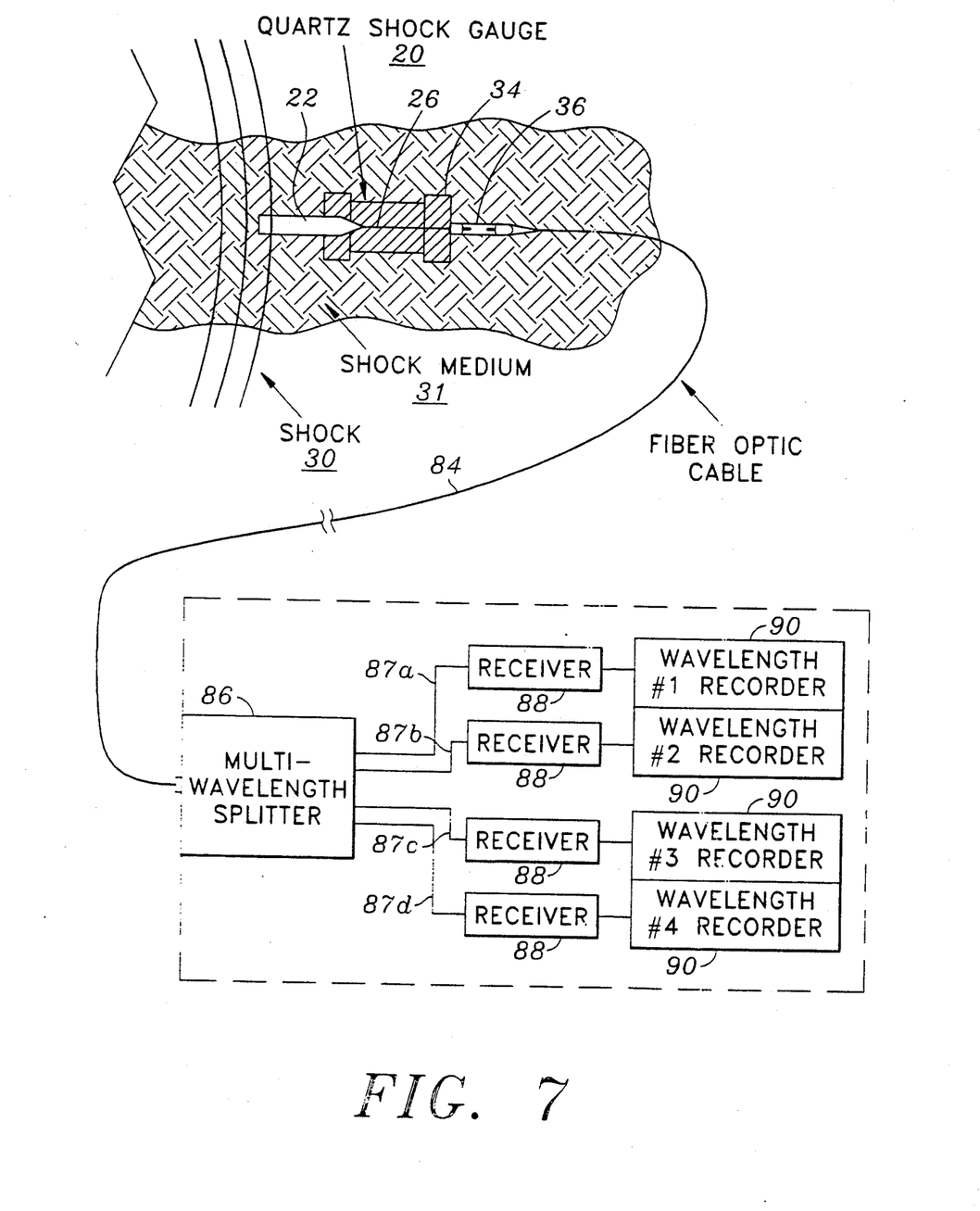
FIG. 7 shows a system for measuring and analyzing a shock wave in accordance with the present invention.

Turning next to FIG. 7, a system for measuring and analyzing a shock wave in accordance with the present invention is illustrated. A shock wave gauge 20, of the type described previously in connection with FIGS. 1-3, is embedded in a shock medium 31. This shock gauge 20 includes, as described above, a quartz rod 22 having a fiber optic thread 26 drawn from one end thereof. A protective housing 34 surrounds the thin fiber thread 26 and holds one end of the quartz rod 22. A connector 36 attaches to the fiber thread 26 as it exits from the housing 34. A conventional fiber optic cable 84 is connected to the optical connector 34 and is routed through the shock medium 31 to instrumentation apparatus 92. The optical cable 84 thus optically couples the output of the shock wave gauge 20 to the instrumentation apparatus 92. Advantageously, because the gauge 20 is made from the same type of material as the shock medium 31, and because the shock gauge 20 is orientated so that a minimum area thereof receives the impact of the shock wave, the problem of gauge inclusion is minimized.

It is the function of the instrumentation apparatus 92 to monitor the output of the gauge 20 for the occurrence of any light pulses. If any light pulses are detected, whether visible or infrared, they are analyzed to determine their spectral content, i.e., to determine what wavelengths are present in the light pulses. The wavelengths that are present, in turn, provide an indication of the temperature (thermodynamic data) of the quartz rod and the immediately surrounding medium. Further, as explained previously, due to the Hugoniot relationship of the quartz material, a measure of the pressure (hydrodynamic data) of the shock wave is also provided.

One type of instrumentation apparatus 92 that may be used with the invention is shown as part of FIG. 7. Such apparatus includes a multi-wavelength splitter 86. Such splitter effectively splits the incoming light pulse as a function of its wavelength. Light pulses having a wavelength falling within a first wavelength band are respectively directed or coupled to a first output line 87a. (Such output line comprises a fiber optic cable.) Light pulses having a wavelength falling within a second, third or fourth wavelength band are directed to a second output line 87b, a third output line 87c, or a fourth output line 87d. The wavelength bands are typically 50 to 100 nm in width. Multi-wavelength splitters suitable for this purpose are commercially available from, e.g., Amp of Harrisburg, Pa.

Once separated, each wavelength band is directed through its respective output line to a suitable detector/receiver 88. The detector/receiver 88 may be any suitable detection device, but is preferably realized from an avalanche photodiode, such as a silicon C30902EQC or a silicon PIN diode, such as a C30971EQC. The output of the detection—an electrical signal—is then separately recorded on a suitable recorder 90. Thus, for the configuration shown in FIG. 7, where the incoming light is split into four bands, there are thus four separate detector/receivers 88, and four separate recorders 90. Each recorder thus records, as a function of time, the receipt of any light signal falling within its respective band.

It is noted that the splitting of the light pulse into four wavelength bands as shown in FIG. 7 is only exemplary. Any number of wavelength bands can be used in order to increase the resolution of the detector.

Another type of instrumentation apparatus 92 that may be used with the present invention is a full spectrometer. Such spectrometers are commercially available from several vendors, such as Hewlett Packard Corporation, or could be readily fashioned using commercially available components. Such spectrometer would include the option of recording and/or printing a time resolved spectrum of the light pulses that are measured.

For some applications, it is sufficient to simply detect a shock wave and ascertain its time of arrival. In such instances, a single detection channel and recorder is all that is needed to detect the receipt of any light pulse, regardless of its wavelength, and the multi-wavelength splitter 86 is not needed.

Figure 8:
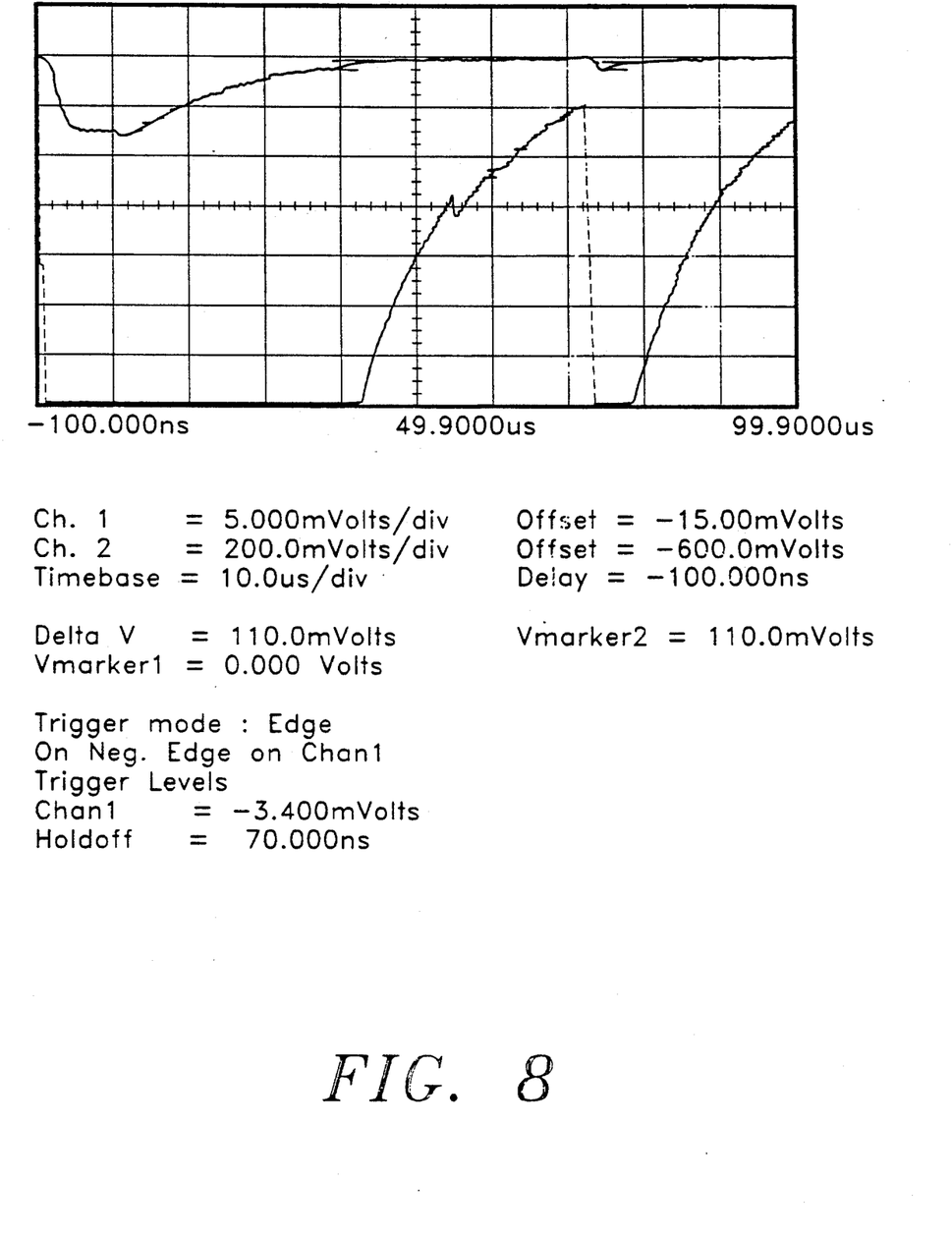
FIG. 8 depicts the electrical output signal from a detector that has sensed the optical output pulse generated by the gauge of the present invention upon being impacted with a shock wave.

By way of a first example of the present invention, FIG. 8 depicts the electrical output signal from a detector that has sensed the optical output pulse generated by a gauge made in accordance with the present invention upon being impacted with a shock wave. Both the upper and lower traces in FIG. 8 are the same signal, with the lower trace being displayed at a scale of 5.0 millivolts per division, and the upper trace being displayed at 200 millivolts per division. This particular example involved impacting a sample gauge with a 0.416 caliber high velocity (2700 feet/second or 0.82 Km/s) rifle bullet. The gauge used for this example was simple avalanche photodiode coupled directly to the output fiber of the gauge, hence there was no wavelength differentiation. The output signal from the avalanche diode is a negative going voltage, hence increased light is indicated by the voltage trace going more negative in FIG. 8. The temporal behavior of the waveform is consistent with the impact of the projectile, as well as the transit time of the projectile through the medium in contact with the gauge material. The example reveals a sufficiently large light output signal from the gauge to facilitate a very high signal to noise ratio.

Figure 9:
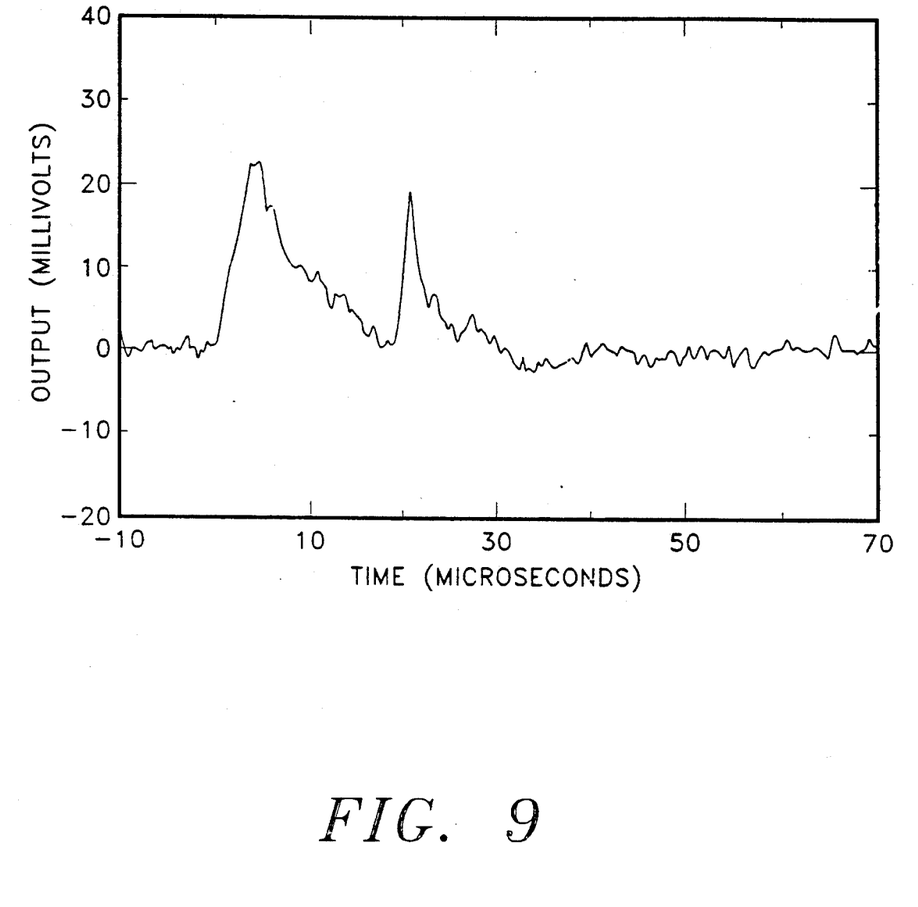
FIG. 9 shows the electrical output signal from a detector coupled to sense a particular wavelength band within the optical output pulse generated by the gauge of the present invention upon being impacted with a shock wave.

By way of a second example, a polycarbonate projectile having a velocity of 2.5 km/sec was directed at a shock gauge made in accordance with the present invention. For this second example, two detecting diodes were used, one adapted to detect 830 nm wavelengths, and the other adapted to detect 1300 nm wavelength signals. The output waveform obtained from the 1300 nm detecting diode is shown in FIG. 9. Again, the data provided by the waveform in FIG. 9 is consistent with the temporal behavior of the projectile-gauge encounter, and has an amplitude consistent with the expected light output.

To further illustrate this second example, for a projectile traveling at 2.5 km/sec, the anticipated pressure due to the impact can be calculated to be on the order of 80 kbars. The Hugoniot of the quartz rod used in the sensor would predict a temperature of about 3000° K. for a shock wave of this magnitude. A temperature in this range should produce a peak wavelength on the order of 1.7 microns. Moreover, the magnitude of the anticipated shock would yield an amplitude of the output signal, assuming a conversion efficiency of 77% for the detector diode, of about 22 mV. As can be seen from the waveform in FIG. 9, these anticipated values are roughly achieved. Hence, the sensor gauge performed as expected.

Thus, it is seen, that the present invention measuring strong shock waves, such as are encountered in underground nuclear tests, earthquakes, volcanoes, explosives testing, and other strong impacts.

It is further seen that the invention provides a shock wave gauge and method of making a shock wave measurement that provides thermodynamic/hydrodynamic data in addition to time of arrival and shock velocity data.

It is also seen that the invention provides a shock wave gauge formed from a mineral material that closely matches the surrounding medium in which the gauge is inserted, thereby minimizing the problem of "gauge inclusion" in the resulting measurement.

While the invention herein disclosed has been described by means of specific embodiments and applications thereof, numerous modifications and variations could be made thereto by those skilled in the art without departing from the scope of the invention set forth in the claims.

What is claimed is:

1. A system for measuring shock waves comprising;
a passive shock wave gauge assembly comprising a plurality of passive pressure sensing elements, each pressure sensing element emitting a pulse of light having a wavelength proportional to the pressure of a shock wave that impacts said pressure sensing element, each of said pressure sensing elements including;
a section of transparent mineral material (i) exhibiting a material Hugoniot whereby the temperature of the mineral material increases as the pressure of the shock wave impacting the mineral material increases and (ii) emitting a light pulse upon impact of the shock wave, said light pulse having a wavelength that varies as a function of the material's temperature, and
an output optical fiber drawn out from said section of transparent mineral material, said light pulse being transmitted over said output fiber;
the section of transparent mineral material of each of said sensing elements comprising a length of rod that extends out of a common mounting plate a distance that is different than the other sensing elements, whereby a tip of each rod will be exposed to the impact of a shock wave at a different time; and
processing means optically coupled to the output optical fiber from each of said pressure sensing elements for collecting and analyzing the emitted light pulse from each of said pressure sensing elements within said shock wave gauge assembly as a function of time.

* * * * *